United States Patent [19]

Meinert et al.

[11] Patent Number: 4,465,396
[45] Date of Patent: Aug. 14, 1984

[54] SHANK CLAMP

[75] Inventors: Harry M. Meinert, Urbandale; John D. Sundberg, Madrid, both of Iowa

[73] Assignee: Deere & Company, Moline, Ill.

[21] Appl. No.: 425,778

[22] Filed: Sep. 28, 1982

[51] Int. Cl.³ .............................................. F16B 9/02
[52] U.S. Cl. .................................... 403/395; 403/396; 403/400; 172/707; 172/763
[58] Field of Search ............... 403/395, 398, 396, 399, 403/400, 386, 313, 312, 302, 385; 172/707, 708, 763

[56] References Cited

U.S. PATENT DOCUMENTS

| | | | |
|---|---|---|---|
| 1,394,904 | 10/1921 | Isgrig | 403/398 |
| 3,827,505 | 8/1974 | Sosalla | 172/707 |
| 3,896,883 | 7/1975 | Howes | 172/707 |
| 4,050,524 | 9/1977 | Hake | 172/707 |

FOREIGN PATENT DOCUMENTS 153486 10/1953 Australia ............................. 403/396

Primary Examiner—Cornelius J. Husar
Assistant Examiner—Joseph A. Fischetti

[57] ABSTRACT

An improved clamp arrangement for attaching a shank, particularly an S-tine shank, to a rectangular beam of an implement. A bracket is positioned against two adjacent faces of the beam and includes a formed end with a continuous transition zone which partially wraps around the front edge of the beam to prevent the clamp and shank from rotating horizontally. The formed end also provides increased depth of section to increase the bending strength of the bracket.

8 Claims, 4 Drawing Figures

SHANK CLAMP

BACKGROUND OF THE INVENTION

This invention relates generally to tillage implements and more specifically to a clamp for attaching the shank of an earthworking tool to a support beam on an implement.

Tillage implements such as cultivators often include an earthworking tool having a shank which is connected to a beam of square or rectangular cross section by a right-angle bracket and a shank bolt. For example, an S-tine shank includes a flat end portion which passes through an aperture in one leg of the bracket and is tightened against one face of the beam by a shank bolt tensioned between the end of the other leg and the flat end portion. Such a prior art connecting or clamp structure is shown in FIG. 1 at 10 and includes a right-angle bracket 12 having first and second legs 14 and 16 positioned against upper and rear faces 18 and 20 of a beam 22 on the tillage implement (not shown). The bracket 12 is fabricated from a flat strip of metal, and the legs 14 and 16 have flat, apertured end portions 24 and 26, respectively, which project beyond the forward and bottom faces 28 and 30 of the beam 22. A shank 32 includes a straight connecting portion 34 extending through the aperture in the end portion 26 and under the face 30. The shank portion 34 includes an apertured end 36 which extends beyond the face 28 directly below the end 24 of the bracket 12. The bracket 12 and shank 32 are secured to the beam 22 by a shank bolt 40 which is tightened to draw the leg 14 and shank portion 34 towards each other and against faces 18 and 30 of the beam 22. An earthworking tool 42 is supported at the lower end of the shank 32 for movement forwardly (arrow F) through the soil.

The prior art structure of FIG. 1 has several shortcomings. The bracket 12 and shank 32 can rotate horizontally on the beam 22 since there is little or no positive clamping of the bracket 12 against the forward face 28 of the beam. If the shank bolt 40 is tightened beyond a preselected tension, the end 24 will begin to bend downwardly. Once the end 24 bends, the bracket 12 is weakened and can no longer effectively be clamped against the beam 22.

To help overcome the lack of positive clamping, some prior art structures include brackets which are similar to that shown at 12 in FIG. 1 but which have end portions 24 formed with downturned tabs or tangs butting against the front face 30 of the beam 22. The tangs are formed by cutting the leg 14 lengthwise on opposite sides of the aperture and bending the edge portions downwardly and parallel to the face 30. Alternatively, both sides of the leg 14 are cut adjacent the front face 30 perpendicular to the lengthwise direction of the leg, and the sides of the end portion 24 are bent downwardly from the horizontal. In either type of tanged structure, the leg 14 is cut so that the cross-sectional area of the leg, and therefore the bending resistance and clamping strength of the leg, is reduced. To increase bending resistance of the tanged structure, the bracket 12 must be fabricated from metal strip having increased cross-sectional area which increases the cost and bulk of the implement.

It is therefore an object of the present invention to provide an improved clamp arrangement for attaching a cultivator shank or the like to a beam.

It is another object of the invention to provide an improved shank clamp arrangement which prevents the shank from rotating horizontally on the supporting beam.

It is another object of the invention to provide an improved shank clamp arrangement which has increased bending resistance and clamping strength as compared with prior art structures of the same size. It is another object to provide such a clamp arrangement with a bracket which has an increased depth of section in the area which receives the shank bolt.

It is a further object to provide an improved clamp arrangement for an S-tine shank. It is yet another object to provide such an arrangement with a bracket having positive clamping structure which obviates cutting of the bracket adjacent the shank bolt aperture.

In accordance with the above objects, a shank clamping arrangement is provided with a bracket having first and second leg portions adapted for positioning against adjacent faces of the mounting beam. The first leg portion includes a formed end portion which receives the shank bolt. The formed portion includes a rounded transition area for wrapping around the edge of the beam to positively clamp the shank and bracket. The transition area is continuous and obviates cutting of the bracket near the shank bolt. The formed end with the continuous transition area provides an increased depth of section to increase bending resistance and clamping strength for a given bracket size.

These and other objects, features and advantages will become apparent from the description which follows when taken with the accompanying drawings.

DESCRIPTION OF THE PREFERRED EMBODIMENT

Figure 2:
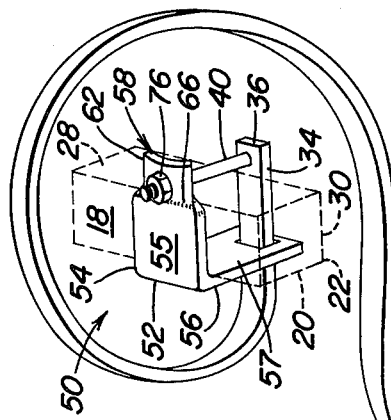
FIG. 2 is a view similar to FIG. 1, but showing the improved clamping arrangement of the present invention.
Figure 2:
Figure 1:
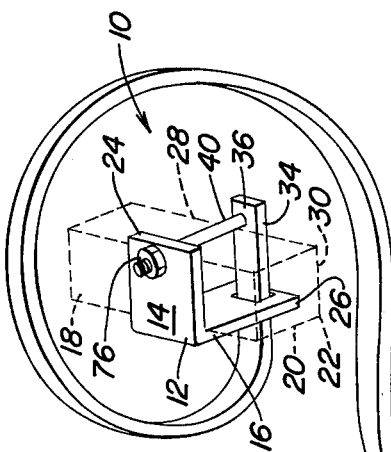
FIG. 1 is a perspective view of a prior art clamping arrangement for an S-tine shank.
Figure 1:
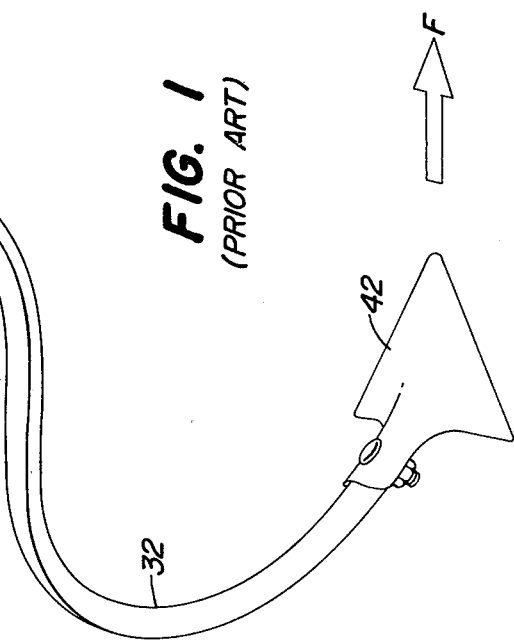
Figure 4:
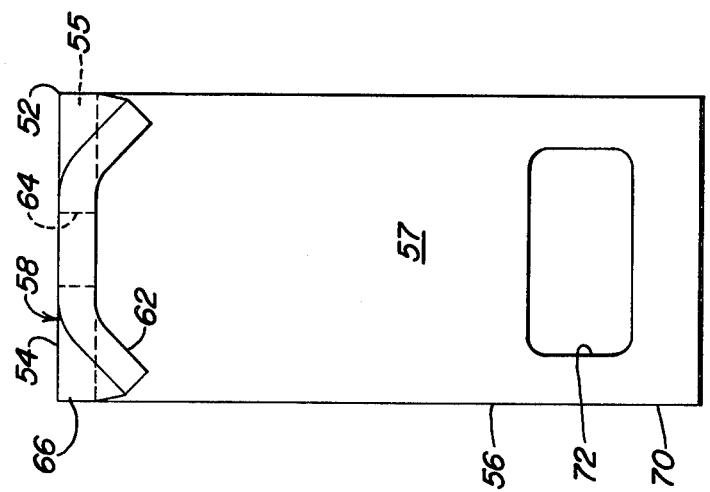
FIG. 4 is a front view of the bracket of FIG. 3.
Figure 3:
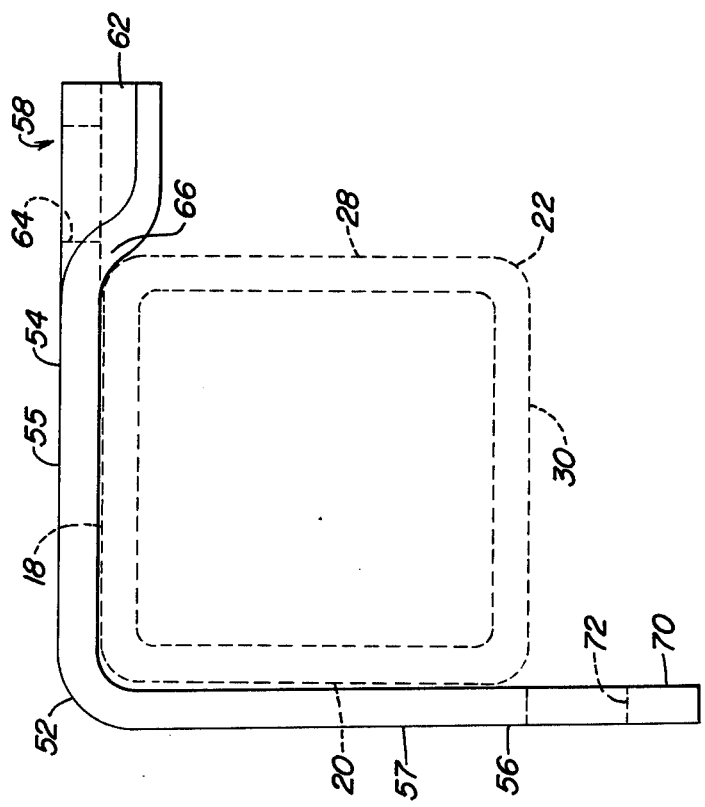
FIG. 3 is a side view of the bracket utilized with the clamping arrangement of FIG. 2.

Referring now to FIG. 2, therein is shown an S-tine shank 32 connected to the beam 22 by an improved clamping arrangement, indicated generally at 50, constructed in accordance with the principles of the present invention. A bracket 52 includes first and second legs 54 and 56 having flat sections 55 and 57 positioned against the upper and rear faces 18 and 20, respectively, of the beam 22. The leg 54 of the bracket 52 includes a formed end portion 58 having a generally inwardly or downwardly opening channel-shaped end 62 which is centrally apertured or slotted at 64 (FIGS. 3 and 4) to receive the shank bolt 40. The slot 64 is elongated in the lengthwise direction of the leg 54. The end 62 is connected to the flat portion 55 of the leg 54 by a continuous transition area indicated generally at 66 which wraps around the edge of the beam defined by the front face 28. As best illustrated in FIG. 3, the rounded side portions of the transition area 66 will positively clamp the bracket to the beam 22 as the shank bolt 40 draws the formed portion 58 downwardly. The end 58, which preferably is formed in a die, also provides increased depth of section (FIG. 4) to increase the bending strength of the bracket 52 for a given width and thickness of flat metal stock.

The lower end 70 of the leg 56 is apertured at 72 to receive the straight connecting portion 34 of the shank 32 adjacent the lower face 30 of the beam 22 in the conventional manner. The shank bolt 40 is inserted upwardly through the aperture in the end 36 of the shank 32 and through the aperture 64 in the formed portion 58. A nut 76 is tightened against the upper surface of the portion 58 to draw the transition area 66 tightly around the front edge of the beam and to urge the shank connecting portion 34 against the lower face 30 of the beam 22.

The legs 54 and 56 are joined at approximately a right angle, but in the preferred embodiment the angle is slightly less, preferably about eighty-nine degrees, to prevent the lower end 70 of the leg 56 from flaring outwardly from the rear face 20 of the beam 22 as the shank bolt 40 is tightened and the corner of the bracket 52 is pulled forwardly by the wrapping action of the transition area 66.

Having described the preferred embodiment, it will be apparent that modifications can be made without departing from the scope of the invention as defined in the accompanying claims.

We claim:

1. In an implement having a beam with a generally rectangular cross section and including an earthworking tool with a shank, clamping structure for attaching the shank to the beam, said structure comprising:

a right-angle bracket comprising first and second leg portions extending generally perpendicular to each other, each leg portion having a substantially flat beam-contacting portion adapted for positioning against respective first and second adjacent faces of the rectangular beam, said first leg portion having a formed end portion extending outwardly of the edge of the first face defined by the beam face opposite the second face, said formed end portion having a substantially uniform thickness equal to that of the remainder of the first flat portion but having an increased depth of section as compared with the cross section of the first flat portion to provide increased bending resistance, and wherein the formed end portion is channel-shaped and opens toward the edge, said end portion including a transition area extending continuously from the corresponding beam-contacting portion, said transition area adapted for extending partially around said edge of the first face and in contact with said face opposite said second face, said second leg portion including a shank-receiving portion for positioning the shank against the beam face opposite the first face, and tensioning means for clamping the shank and first leg against the respective opposite beam faces and for drawing the transition area tightly against the edge to prevent rotation of the bracket and shank on the beam.

2. The invention as set forth in claim 1 wherein the width of the formed end portion is approximately equal to the width of the first leg.

3. The invention as set forth in claim 2 wherein the transition area includes rounded side portions for contacting the edge and preventing the bracket from rotating on the beam.

4. In an implement having a beam with a generally rectangular cross section and including an earthworking tool with a shank, clamping structure for attaching the shank to the beam, said structure comprising:

a right-angle bracket fabricated from flat metal stock and comprising first and second leg portions adapted for extending along first and second adjacent faces of the beam, said first leg portion including a formed end portion which extends beyond the beam face opposite the second face and provides increased depth of section for increased bending strength of the first leg, said formed end portion including rounded sides projecting inwardly along the edge of the first beam face and in contact with said face opposite said second face, said second leg portion including shank positioning means for supporting the shank adjacent the beam face opposite the first face and generally parallel to the first leg, and means for urging the rounded sides inwardly against the edge of the first beam face to prevent rotation of the bracket on the beam.

5. The invention as set forth in claim 4 wherein the means for urging includes a bolt extending adjacent the beam face opposite the second face and tensioned between the shank and the formed end of the bracket.

6. The invention as set forth in claim 4 or 5 wherein the first and second faces comprise the top and rear faces, respectively, of the beam, and wherein the shank extends under the beam and rearwardly of the rear face.

7. The invention as set forth in claim 4 or 5 wherein the first and second legs are formed by bending the flat metal stock to an angle of slightly less than or equal to ninety degrees.

8. The invention as set forth in claim 6 wherein the formed end portion is channel-shaped and opens downwardly toward the shank.

* * * * *